United States Patent
Fiacco et al.

[19]

[11] Patent Number: 6,154,594
[45] Date of Patent: Nov. 28, 2000

[54] MULTICORE GLASS OPTICAL FIBER AND METHODS OF MANUFACTURING SUCH FIBERS

[75] Inventors: Richard M. Fiacco; Michael J. Hackert, both of Corning; Daniel W. Hawtof, Painted Post; M. Ted Van Ryn, Big Flats, all of N.Y.

[73] Assignee: Corning Incorporated, Corning, N.Y.

[21] Appl. No.: 09/116,182

[22] Filed: Jul. 15, 1998

[51] Int. Cl.⁷ .................................................. G02B 6/02
[52] U.S. Cl. ............................................................. 385/126
[58] Field of Search ................................. 385/123–126, 385/141, 147

[56] References Cited

U.S. PATENT DOCUMENTS

| | | | |
|---|---|---|---|
| 3,902,879 | 9/1975 | Siegmund | 65/3 |
| 4,070,091 | 1/1978 | Taylor et al. | 350/96 |
| 5,113,470 | 5/1992 | Fukushima et al. | 385/126 |
| 5,307,436 | 4/1994 | Berkey | 385/123 |
| 5,313,539 | 5/1994 | Ogawa et al. | 385/76 |
| 5,315,539 | 5/1994 | Hawes | 364/224 |
| 5,519,801 | 5/1996 | Le Noane et al. | 385/115 |
| 5,594,823 | 1/1997 | Tardy et al. | 385/46 |
| 5,608,827 | 3/1997 | Boscher et al. | 385/55 |
| 5,625,728 | 4/1997 | Tardy et al. | 385/30 |
| 5,712,941 | 1/1998 | Imoto et al. | 385/126 |

FOREIGN PATENT DOCUMENTS

| | | | |
|---|---|---|---|
| 0 695 003 A1 | 1/1996 | European Pat. Off. | |
| 0695003 | 1/1996 | European Pat. Off. | 385/126 |
| 0 810 453 A1 | 12/1997 | European Pat. Off. | |
| 56-006202 | 1/1981 | Japan | |
| 57-041602 | 3/1982 | Japan | |
| 59-217632 | 7/1984 | Japan | 385/126 |
| 59-217632 | 12/1984 | Japan | |
| 08119656 | 5/1996 | Japan | 385/126 |

OTHER PUBLICATIONS

J.F. Bourhis, R. Meilleur, P. Nouchi, A. Tardy and G. Orcel, "Manufacturing and Characterization of Multicore Fibers", International Wire & Cable Symposium Proceedings 1997, pp. 584–589.

*Primary Examiner*—Akm E. Ullah
*Attorney, Agent, or Firm*—Robert L. Carlson

[57] ABSTRACT

A glass optical fiber includes multiple cores fused into a single fiber. The new optical fiber is coherent, in the sense that the cores maintain their relative position with respect to each other within the fiber throughout the length of the fiber. That is, a core having specific radial and angular positions at one end of the fiber will have the same radial and angular positions throughout the fiber, including at the fibers opposite end. In one aspect of the invention the fiber presents a circular cross section, in another it presents an elliptical cross section of greater eccentricity to ease the task of orienting the cores within the fiber for connection to signal sources, other fibers, integrated optic devices, receivers and other optical components. An orienting core may suitably be included in the fiber to further assist in orienting the fiber end. In manufacturing the new optical fiber, a silica tube is stuffed with core canes. The resultant assembly is then melted or fused, preferably while being drawn under vacuum, to produce an integrated multicore fiber blank which then can be drawn down to a standard diameter fiber using standard fiber drawing techniques. Alternatively, fusing and drawing can be combined in a single step process.

19 Claims, 9 Drawing Sheets

MULTICORE GLASS OPTICAL FIBER AND METHODS OF MANUFACTURING SUCH FIBERS

FIELD OF THE INVENTION

The present invention is related to improved optical fibers and methods of manufacturing such fibers. In particular, the present invention relates to low cost multiple core or multicore optical fibers.

BACKGROUND OF THE INVENTION

A need exists for relatively low cost optical fibers to connect components in applications such as office intranets and the like. Such applications may be referred to as "fiber to the desktop" or "FTTD" applications. Some of the issues faced or desired system criteria if optical fibers are to replace existing connectors such as copper wires, coaxial cable and the like are ease of manufacture, ease of connection, relatively low cost for run lengths which typically will not exceed 500 m, low attenuation, preferably less than 10 dB/km, and high bandwidth, preferably greater than 500 MHz-km at both 850 and 130 nm.

Some efforts have been made to develop multicore plastic optical fibers. While such fibers are both inexpensive and relatively large so that they can be relatively easily connected, they suffer from poor performance characteristics, such as low bandwidth, high attenuation, possible environmental constraints because plastic will burn and high temperatures will deform the fiber core geometry altering the optical characteristics, and short link lengths, typically 50 m or less. Efforts have also been made to utilize multimode glass optical fibers in FTTD applications. While such fibers meet some of the presently perceived needs, such fibers are still relatively costly and not optimally matched to these applications.

Additionally, some efforts have been made to manufacture multiple core optical fibers, see, for example, EPO 193 921 in the name of Sumitomo Electric Industries published Sep. 10, 1986 and U.S. Pat. No. 4,561,871 assigned to the assignee of the present invention and incorporated by reference herein in its entirety. These approaches involve forming or boring holes in a preform and inserting rods into those holes. As such, they do not have the ease of manufacture or low costs desired for many applications as the hole boring and inserting steps tend to be relatively time consuming and complex tasks which are not readily applicable to forming a fiber with a large plurality of cores, such as eight or more.

While the above discussion addresses several of the presently desired system criteria for FTTD applications, it will be recognized both that other criteria may apply and that a wide variety of applications are ripe for a low cost multicore optical fiber having the properties of the fibers according to the present invention and designed to advantageously address the needs of such applications.

SUMMARY OF THE INVENTION

The present invention is directed to low cost, low attenuation, high bandwidth multicore optical fibers which will preferably support long link lengths, be environmentally robust, and have high band insensitivity when compared to typical multimode fiber. The present invention also relates to methods of producing such optical fibers. The invention accomplishes these goals by providing a glass optical fiber which includes multiple cores fused into a single integral fiber. This optical fiber is coherent, in the sense that all the cores within the fiber maintain their position relative to each other within the fiber throughout its length.

In one aspect of the invention the fiber presents a circular cross section. In another, it presents an elliptical cross section of greater eccentricity than that of a circle. The term elliptical cross section will generally be used herein in reference to cross sections having greater eccentricity than that of a circle. The elliptical cross section eases the task of physically orienting the cores within the fiber for connection to signal sources, to other fibers, to integrated optic devices, to receivers and to other optical components. Other non-circular cross sections are contemplated by the invention. Further, an orienting core or cores may be included in the fiber to assist in orienting the fiber end.

Although each of the multiple cores within the new fiber may be formed as step- or graded-index fibers and may be single or multi-mode, the current preferred embodiment employs multiple graded index single-mode fibers. Each core may be employed to carry a separate signal. Alternatively, in order to provide redundancy and to ease the task of coupling signals into multimode fibers, each of the cores within the new fiber may carry the same signal. The new fiber is particularly suited to low cost, high performance applications such as FTTD applications.

In one method of manufacturing, a silica tube is loaded or stuffed with graded index silica canes doped with germania. Enough canes are placed within the silica tube to hold one another in position. Silica spacer rods may also be added to insure that the graded index canes maintain their positions within the silica tube. The tube and canes are then partially melted, fused, and slightly drawn under vacuum to produce a single integrated multi-core fiber blank. The multi-core fiber blank is then preferably drawn down to a standard fiber diameter utilizing standard draw techniques. In an alternative, presently preferred approach, a vacuum is applied during the draw eliminating the separate step of forming a blank. In both cases, the draw ratio is used to determine the starting diameter of the step index canes, that is, the canes are drawn to a preferred core diameter, typically one which insures single mode operation. These and other features, aspects and advantages of the invention will be apparent to those skilled in the art from the following detailed description, taken together with the accompanying drawings.

DETAILED DESCRIPTION

Glass optical fibers made in accordance with the present invention are formed from multiple cores fused into a single integral fiber. In a presently preferred embodiment, each core is clad with a glass having a lower index of refraction than that of the core, thus yielding multiple graded index light cores which guide a single mode of light, thus providing high performance and low dispersion loss operation. At the same time, the availability of multiple cores simplifies connection of the fiber to an optical source or sources, optical receiver or the interconnection of one fiber to another, thus reducing the costs and performance degradation associated with connection losses. The fiber of the present invention is particularly suited for applications such as fiber to the desktop (FTTD) applications which provide communications over wide area and local area networks. The longest fiber links for such applications will typically be no longer than 500 m long, attenuation should be no more than current FDDI 62.5 µm fiber attenuation specifications, and bandwidths should desirably be greater than 500 MHz-km at 850 and 1300 nm operating windows.

Figure 1A:
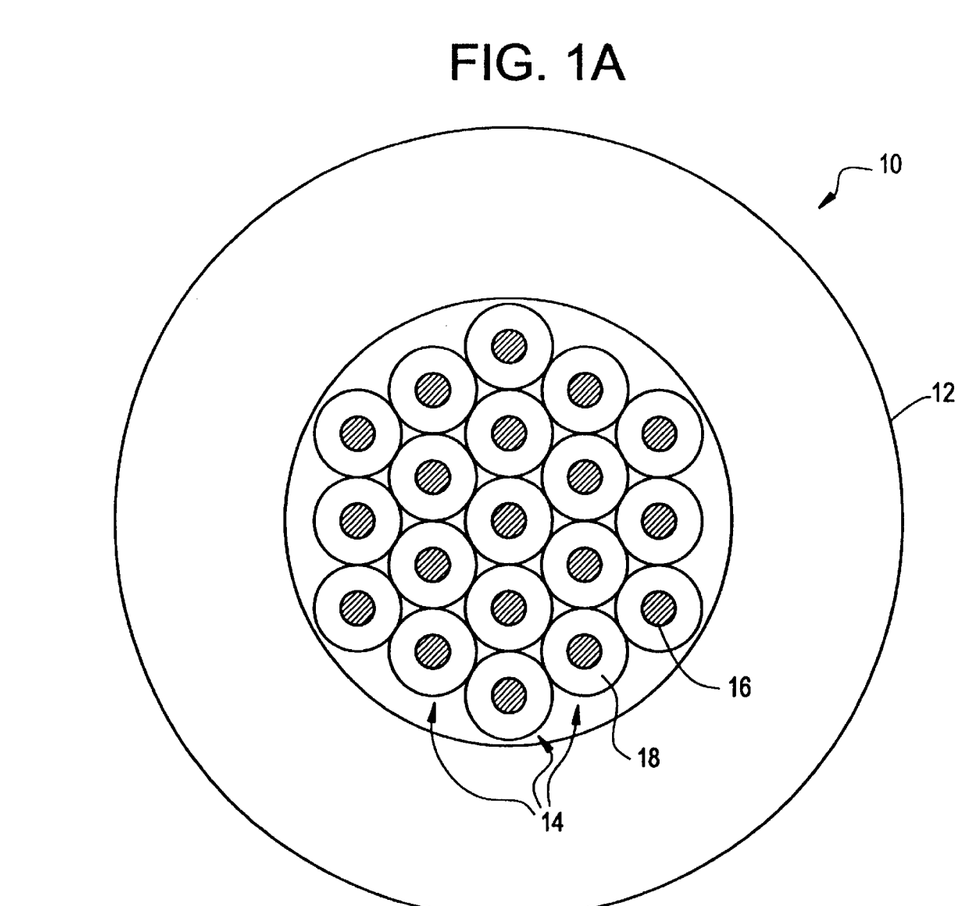
FIG. 1A is a sectional view of a silica sleeve or tube, packed with canes to form a predraw blank which may be heated and drawn to form a multicore glass optical fiber in accordance with a first embodiment of the present invention.
Figure 1B:
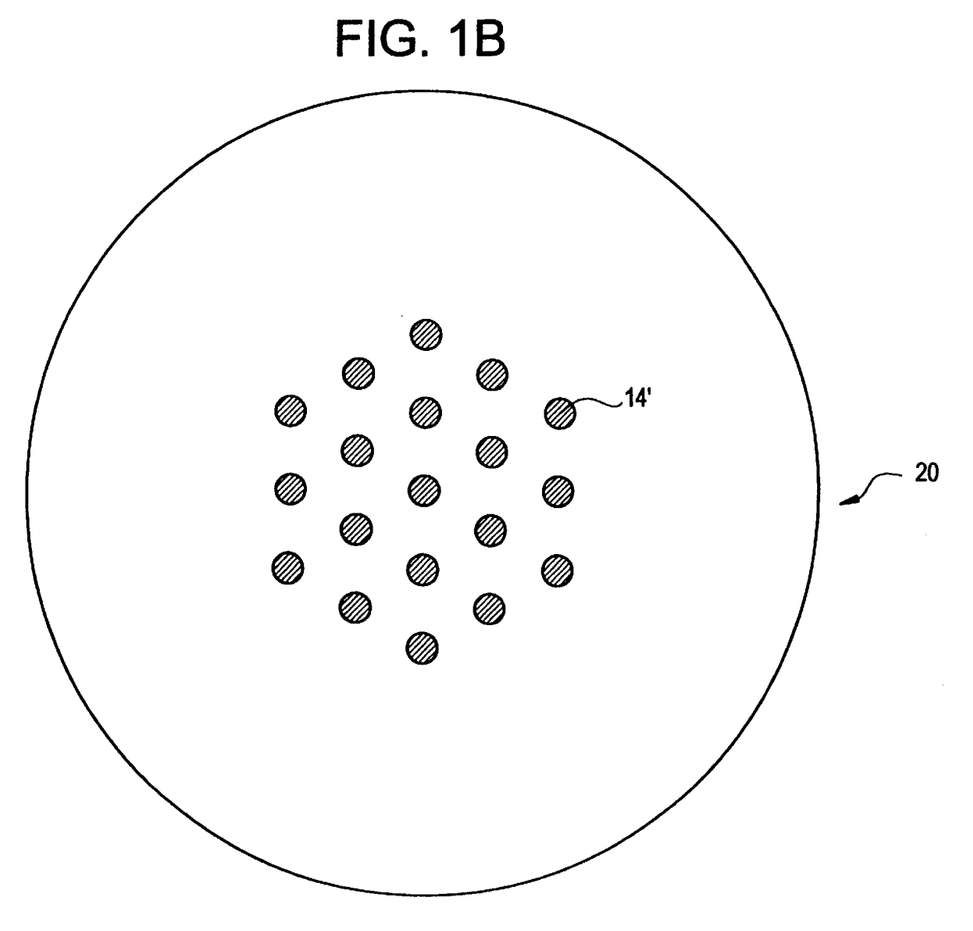
FIG. 1B is a sectional view of a fiber drawn using the predraw blank assembly illustrated in FIG. 1A.

The sectional view of FIGS. 1A and 1B illustrate a first embodiment of predraw blank 10 and the resultant multicore glass optical fiber 20 drawn in accordance with the present invention. The fiber 20 illustrated in FIG. 1B is formed from a blank 10 illustrated in FIG. 1A, which includes a silica tube 12, or sleeve. While a silica tube is presently preferred, it will be recognized that it might be doped or that other materials might be chosen depending upon the application. Tube 12 in FIG. 1A is filled with canes 14, which may suitably be graded, step or segmented index canes. The blank 10 is heated and drawn under vacuum as described in greater detail below. Each cane includes a core 16, which preferably is doped with germania, $GeO_2$, to produce a preferred index of refraction, and a silica, $SiO_2$, cladding 18. In the illustrated embodiment, the packing fraction within the tube is substantially maximized, or, in other words the void spaces between canes are reduced, with each cane having a 0.547 core/clad ratio. The canes 14 are preferably symmetrically distributed within the tube 12 and the packing arrangement may be suitably computed using CAD software, other computer software, or any suitable method of computation including by hand. By way of example, one suitable arrangement for the blank 10 employs canes 14 having a delta of about 2%, an outside diameter of the tube 12 of 49.97 mm, and an inside diameter of 25.05 mm, such that the blank may be suitably drawn down to a standard fiber size having an outside diameter of 125 µm. By way of example, a blank of 330 mm or 13 inches starting length may be drawn to a length of about 30 km. As used herein, delta=$(n_1^2-n_2^2)/2n_1^2$/where $n_1$=refractive index of the core, and $n_2$=refractive index of the cladding glass. The ratio of the outer diameter and the inner diameter of tube 12 will preferably be maintained at about 2:1, but it will be recognized that the size can be varied to scale the total draw length up or down. A cross section of the finished fiber 20 is illustrated in the right portion of FIG. 1 for comparison.

The blank 10 is partially melted or heated at 1800–1950 NC for 120 minutes, while subjected to a vacuum between the tube outer diameter and the tube inner diameter thus collapsing and fusing the core canes and the tube 12 into a substantially void free integral blank or preform. The blank is then conventionally drawn in a furnace at about 2000 NC down to the diameter of the finished fiber 20. Alternatively, drawing may be done under vacuum as discussed further below.

Preferably, the cores 16 of the canes 14 remain isolated from one another by the cladding 18 throughout the drawing process, but it will be recognized that this may not be critical for certain applications. It will be recognized that the cladding 18 from multiple canes 14 will fuse together as part of the above process. Since the canes 14 are packed relatively tightly within the tube 12 and the canes 14 are fused to one another and to the tube 12 before drawing, all the canes 14 within the blank 10 maintain their relative cross-sectional positions within the blank 10 during the drawing process. Consequently, the cores 14', within the finished fiber 20 will have the same cross-sectional profile relative to each other as they had in the blank 10, and that profile will be consistent throughout the fiber 20 as discussed further below in connection with FIG. 3. The fiber 20 is coherent in this sense.

A variety of multicore fibers in accordance with the present invention have been produced and tested. For example, nineteen core canes having a 0.364 core/clad ratio (what is this?), 1% delta, and 0.19 numerical aperture ("NA"), were symmetrically placed in a silica tube having an inside diameter of 25.05 mm and an outside diameter of 49.97 mm. The core of each blank was composed of germania doped silica and had a core diameter of 1.77 mm. Each core blank's cladding was composed of $SiO_2$ and had an outside diameter of 4.87 mm. This preform was then drawn under a substantial vacuum down to a point where the outside diameter of the new fiber was 125 Fm, yielding an approximate core diameter of 5.23 µm for each of the 19 cores within the fiber.

The new fiber's cutoff wavelength was in the 810 to 974 nm range. The bandwidth for both 850 nm and 1300 nm light sources was approximately 2 GHz-km. Bending losses for the new fiber were very low, an order or magnitude less than those typical for standard multimode fiber. Attenuation met FDDI specifications for premise market fibers for 850 nm 1300 nm sources, with measured losses of 2.2 db/km at 850 nm and 0.468 dB/km at 1300 nm, respectively.

Another exemplary multicore fiber was built. This fiber had 85 core canes, each with a 0.547 core/clad ratio, 2% delta, and 0.27 NA. These 85 cores were symmetrically placed in a silica tube having an inside diameter of 25.05 mm and an outside diameter of 49.97 mm. The core of each cane was composed of germanium doped silica and had an outside diameter of 130 mm. Each core blank's cladding was composed of silica and had an outside diameter of 2.37 mm. The silica tube and cores were drawn under vacuum as described further below to form a void free fiber having a width and outside diameter of 125 µm, yielding a core diameter of 3.7 µm for each of the 85 cores within the fiber. This fiber's cutoff wavelength was in the 950 nm to 1000 nm range. The bandwidth for an 850 nm light source was greater than 1.5 GH-zkm, but slightly less than 500 MHz-km for a 1300 nm source. Bending losses and attenuation were similar to those for the above fiber with 19 cores.

Additionally, the amount of germania doped silica required for these embodiments is substantially less than would be required for a multimode fiber having a comparable outer diameter. Although a single-core design might provide connectivity advantages over conventional, small diameter fibers, a single core of comparable dimension would support many more modes than the cores of the new multicore design. Therefore, conventional single core fiber is not only much more expensive than the new multicore design (as a result of significantly more germania doped silica), it also features a substantially reduced bandwidth in comparison to the new multicore fiber. For example, the 19 core fiber used 14% of the $GeO_2$ of a standard 50 $\mu$m multimode fiber with a 1% delta, and the 85 core fiber used 28% of the $GeO_2$ of a standard 62.5 $\mu$m multimode fiber with a 2% delta.

Figure 2:
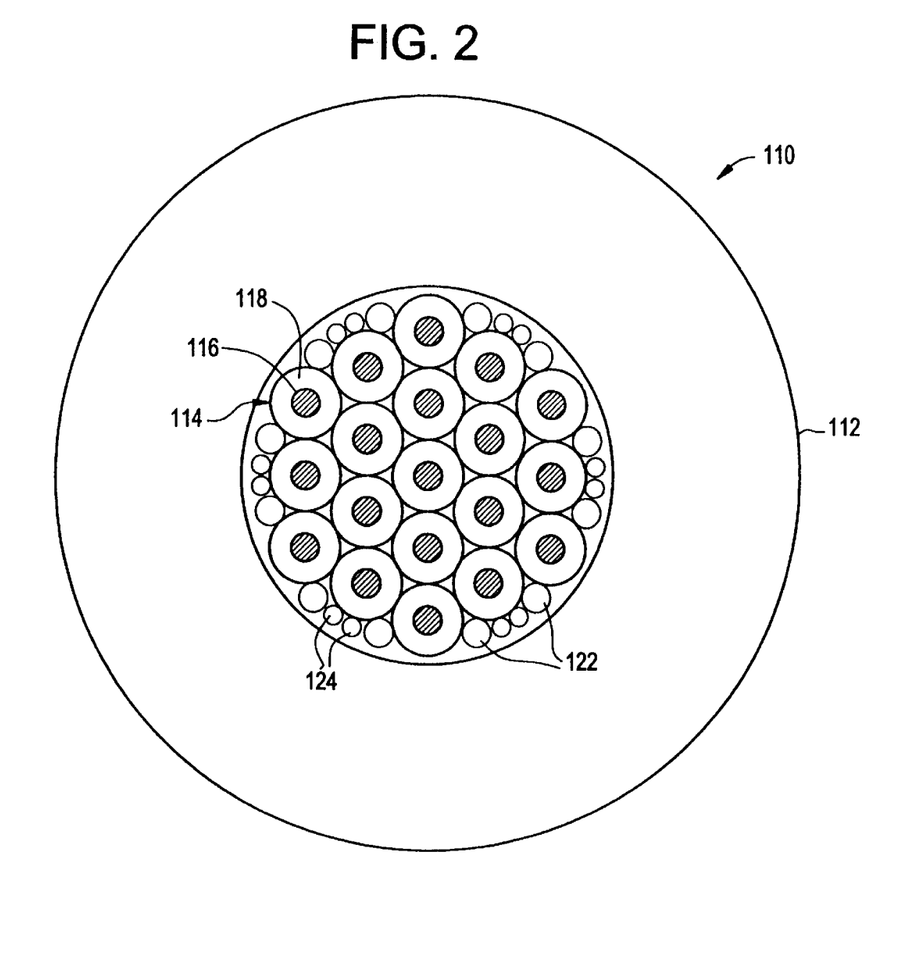
FIG. 2 is a sectional view of an alternative predraw blank which is used to make a multicore glass optical fiber in accordance with a second embodiment of the present invention.

The sectional view of FIG. 2 illustrates a cross section of a blank 110 which includes nineteen canes 114 stuffed into a silica tube 112. The canes, which include cores 116 and cladding material 118, are symmetrically distributed through the inside diameter of the silica tube 112. Each cane has an outside diameter of 4.87 and a 0.364 core/clad ratio. The inside and outside diameters of the silica tube are 25.05 mm and 49.97 mm, respectively. In this embodiment, the relationship between the outside diameter of the canes 114 and the inside diameter of the silica tube 112 is such that the canes do not substantially fill the interior of the silica tube. As a result, the canes 114 could shift position and settle during the fiber formation process so that their positions with respect to each other may vary undesirably or a non-circular cross-section of individual canes may result. Silica canes 122 and 124 are thus preferably introduced to the tube cavity to act as spacers or fillers which hold the canes 114 in a desired position ensuring proper drawing and reducing void space to ensure round canes subsequent to drawing. Silica canes of different sizes may be employed to insure that the canes 114 maintain their desired positions. In this exemplary embodiment, canes 122 have an outside diameter of 2 mm and canes 124 have an outside diameter of 1.25 mm. The entire blank 110 is drawn, as previously described, down to a fiber 120 having an outside diameter of 125 $\mu$m, yielding multiple 5.23 Fm cores 116' that have 1% delta and 0.19 NA.

Figure 3:
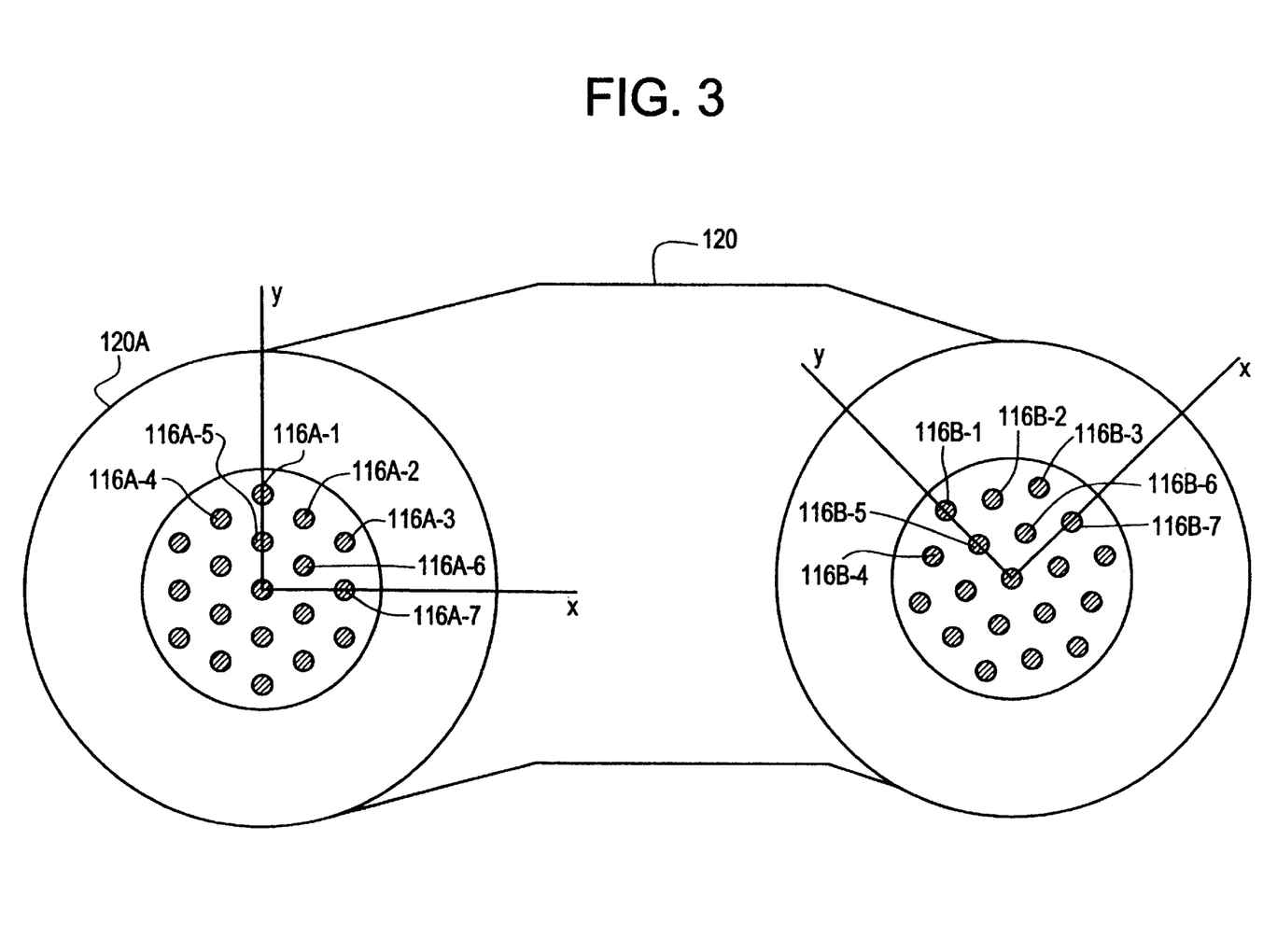
FIG. 3 is a partial sectional schematic view of a fiber drawn from the predraw blank illustrated in FIG. 2, and illustrating the fiber's core coherence.

The sectional view of FIG. 3 illustrates the coherence of the new fiber 120. FIG. 3 is a schematic illustration of a 6 fiber (in reality the voids would be gone, as illustrated in FIG. 1B) drawn in accordance with the invention. That is, the ends of cores 116A-1 through 116A-7 at one end 120A of the fiber 120 have corresponding ends 116B-1 through 116B-7 which occupy the same cross sectional positions with respect to each other at the opposite end 120B of the fiber 120. In other words, core end 116A-1 has the same position relative to 116A-2 and 116A-5, as 116B-1 has with respect to 116B-2 and 116B-5 even though the coordinate axes x and y have been substantially rotated. This relationship holds true for all the cores. One advantage of this coherence is that if, for example, a light source is small enough that it couples into only those cores which extend to the diameter of cores 116A-5 and 116A-6, that is, not to the outermost cores, which would include cores 116A-1, 116A-2, 116A-3, 116A-4, and 116A-7, the light coupled into those central cores would be transmitted to the corresponding central cores 116B-5 and 116B-6 at the opposite end of the fiber 120B. In this manner, light may be coupled from the central cores of the opposite end of the fiber 120B into a receiver or another fiber which has a smaller acceptance angle than would be required if the core ends were distributed randomly throughout the fiber cross section. Additionally, as will be discussed in greater detail below in relation to FIG. 4, this coherence permits the new fiber to support multiple signals. Further, as discussed below in connection with FIG. 4, an orienting cane or other alignment mechanism may be employed.

Figure 4:
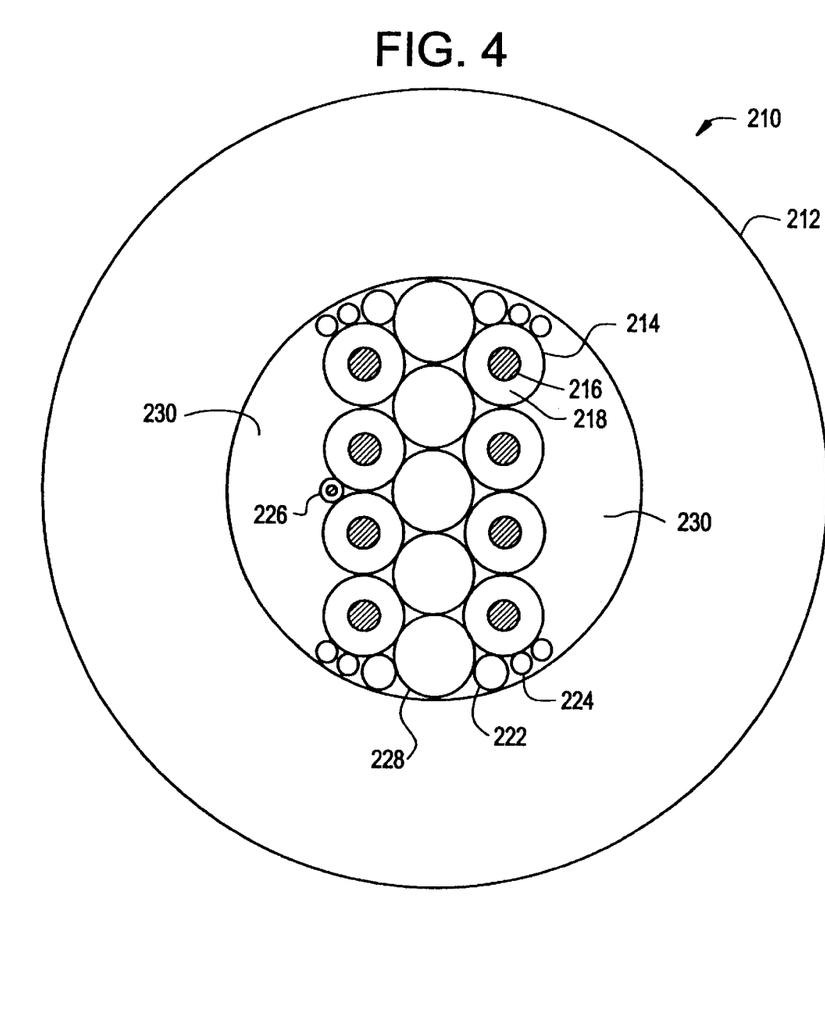
FIG. 4 is a sectional view of a predraw blank for making a multicore glass optical fiber having an elliptical cross-section in accordance with a third embodiment of the present invention.

Turning to FIG. 4, an orienting cane 226 may be added to the draw blank preform in accordance with the present invention to aid in positioning such fibers in their proper orientation with respect to a source, a receiver, another length of fiber, or any other component it is desired to align with. The orienting cane 226 may, for example, have an index of refraction profile which makes it visually differentiable. For example, it may appear dark when viewed end-on, or alternating steps of index of refraction may be utilized to produce a core with visible lines in it. Such visual differentiation readily allows a technician to place the fiber end 220A in a preferred orientation to properly align with other fibers, connectors, components or the like. With the fiber end 220A oriented in this manner, each of the cores may accept signals from different sources and thereby carry multiple signals simultaneously. Since the new fiber is coherent, there would be no difficulty insuring that a signal entering a given core at one end of the fiber exits the fiber at a predetermined place at the other end of the fiber and, as a result, multiple signals, such as the signals of a high-speed parallel bus for example, could be distributed with relative ease employing standardized connectors.

The blank 210 in FIG. 4 can be used to produce a relatively inexpensive multicore fiber that is somewhat analogous to an electrical ribbon cable, but having substantially lower losses and a substantially higher bandwidth without electrical interference. Such a fiber generally affords simpler connection and alignment than the multicore fibers having circular cross section discussed up to this point. The blank 210 includes a silica tube 212 having an outside diameter of 49.93 mm and an inside diameter of 24.88 mm. Inside the silica tube are eight core canes 214, each having a 0.395 core/clad ratio and an outside diameter of 4.871 mm. Five 4.871 mm diameter silica canes 28 divide the eight core canes 214 and, along with four 2 mm diameter silica canes 222 and eight 1.25 mm diameter silica canes 224 help to maintain the core canes 214 in a desired position. The blank 210 is heated and drawn under vacuum. Vacuum is applied at the draw utilizing a female handle which suspends blank 210 from a boule. A male ball joint is then inserted into the female handle and a vacuum is applied by a pump through the handle to the blank 210 which is then drawn. When the tip of the blank 210 is inserted into a draw furnace, it seals off. Alternatively, it could be sealed during consolidation or by hand using a gas oxygen torch prior to drawing. Because there are voids 230 within the tube 212 to either side of the canes 214 and filler canes 222, 224, 226, and 228, when the blank 210 is drawn a multicore fiber having a substantially elliptical cross section with 127.5 $\mu$m major and 120 $\mu$m minor axes results. The fiber's elliptical cross section and the orienting core resulting from the drawing of the corresponding orienting cane 226 both ease and ensure proper orientation of the fiber when installed. Nevertheless, each core's cross section remains circular and has an outside diameter of 10 $\mu$m.

Figure 5:
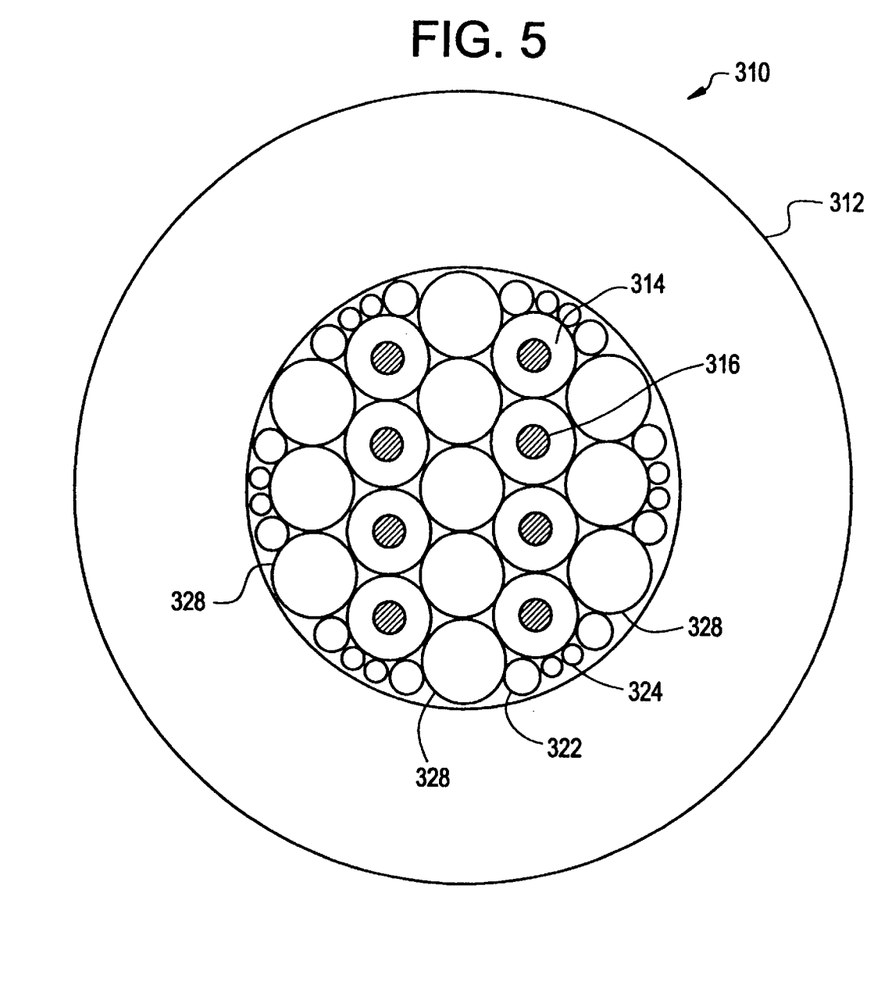
FIG. 5 is a sectional view of another predraw blank for making a multicore glass optical fiber in accordance with a fourth embodiment of the present invention.

Another aspect of the present invention is illustrated in the embodiment of FIG. 5. Blank 310 includes silica tube 312 having inside and outside diameters of 24.88 mm and 49.93 mm, respectively. Eight core canes 314, each having a 0.395 core/clad ratio and an outside diameter of 4.871 mm, eleven 4.871 mm diameter silica canes 328, eight 2 mm diameter silica canes 322, and eight 1.25 mm diameter silica canes 324 substantially fill the inner diameter of the silica tube 312. After heating and drawing, the resultant cores 316 of the resultant fiber maintain their core/clad ratio, and the core diameter is dependent on the cutoff wavelength desired or required.

Figure 6:
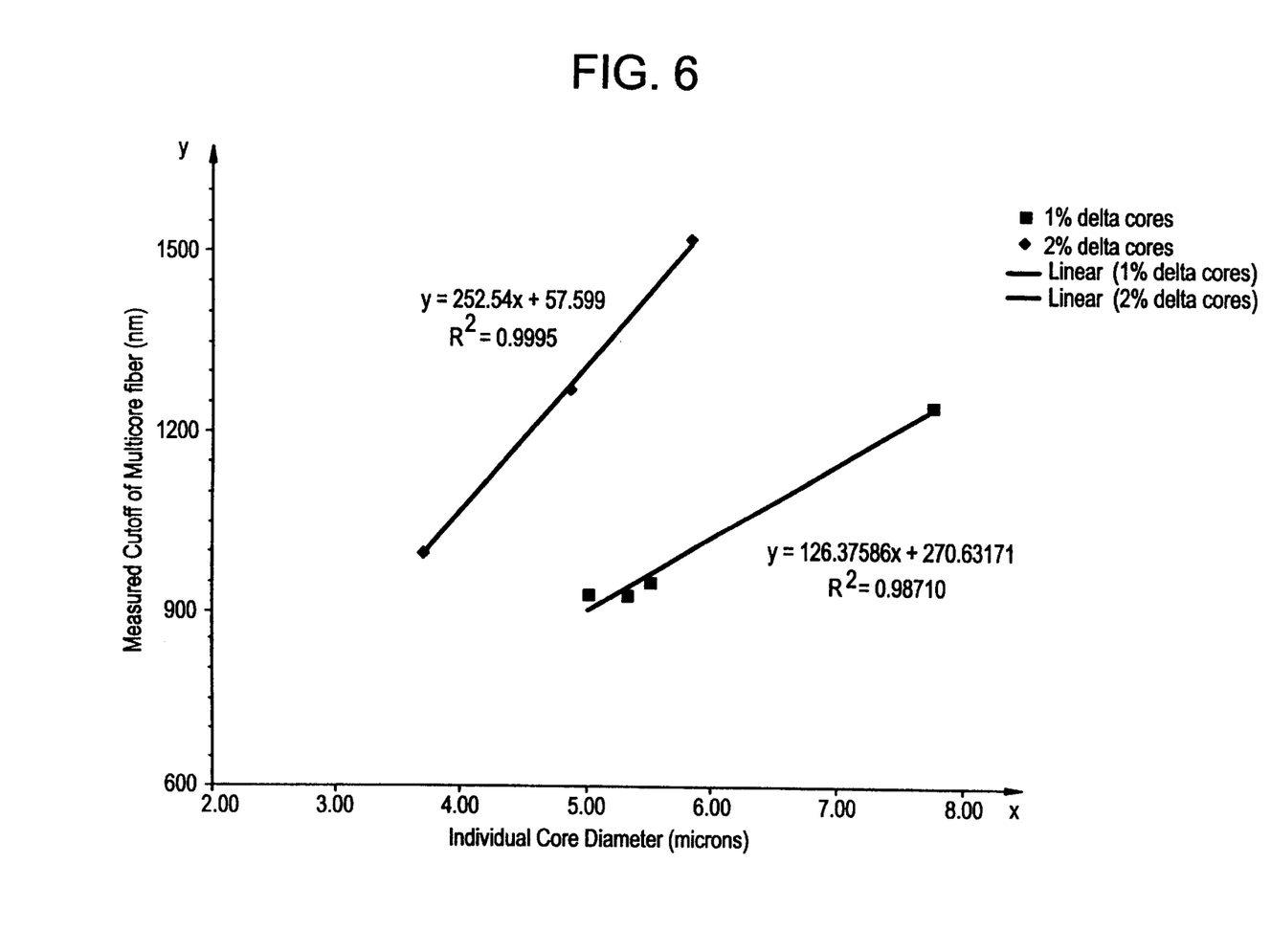
FIG. 6 is a plot of experimental data relating the measured cutoff wavelength of multicore fiber made according to the present invention, to individual core diameter.

For example, FIG. 6 shows a plot of experimental data of the measured cutoff of multicore fibers according to the present invention in nm versus individual core diameter in Tm for 1% and 2% delta cores. Utilizing such data, the proper selection of materials and dimensions may be readily made to suit the desired application.

Although the blank 310 and resultant fiber upon drawing present circular cross sections, the cores 314 within the fiber are arranged in the same ribbon pattern, e.g., in parallel rows, as the fiber of FIG. 4. As previously described, an orienting cane, could be added to ease the mating of such fibers.

Figure 7A:
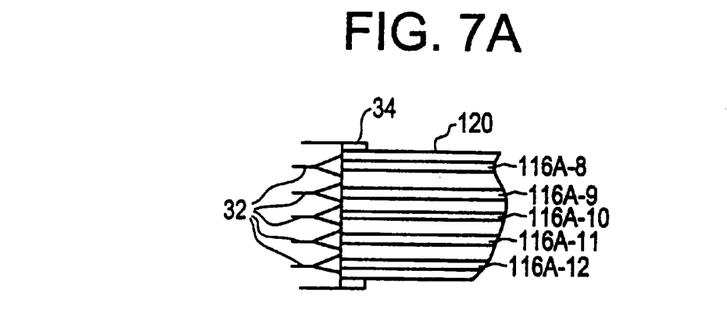
FIGS. 7A and 7B illustrate the connection of a multicore optical glass fiber in accordance with the present invention to receive light from multiple sources and a single source, respectively.
Figure 7B:
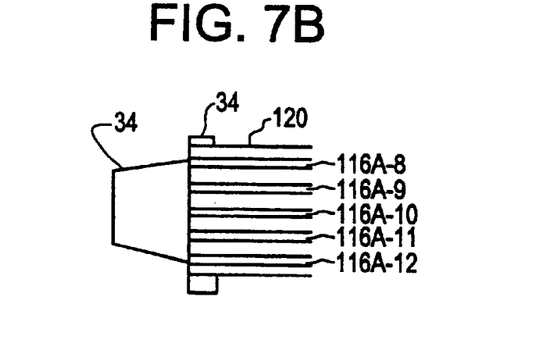

The longitudinal sectional view of FIG. 7A illustrates the coupling of light from multiple sources 32 into individual cores such as the middle cores 116A-8 through 116A-12 of FIG. 3 of a multicore fiber 120 drawn from a blank 110, such as that illustrated in FIG. 2. A connector 34 aligns sources 32 and cores 14. The user or technician inserting the fiber into the connector 34 may be aided in the alignment by orienting cane or canes within the fiber and the fiber may also have a non circular cross section e.g. more closely matching the shape of the connector as discussed below in connection with FIG. 8. The longitudinal sectional view of FIG. 7B illustrates a similar coupling of light into a multicore fiber, but in this case a single source 34 provides a light signal for coupling into multiple cores, such as the cores 116A-8 through 116A-12 of FIG. 2.

Figure 8:
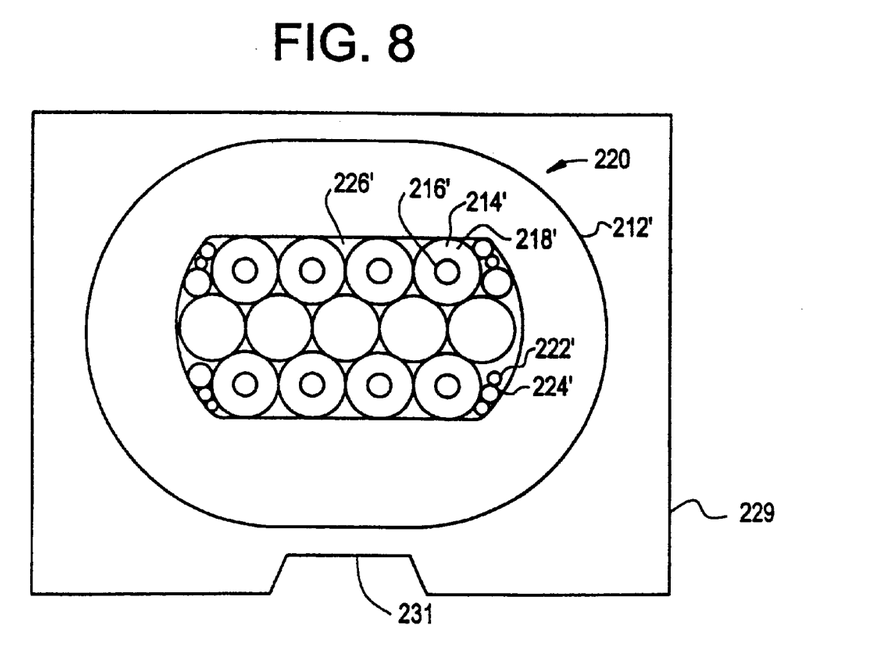
FIG. 8 illustrates an elliptical cross-section fiber mated with a matching elliptical port of a connector.

FIG. 8 illustrates a schematic view of a fiber 220 drawn from a predraw blank such as the blank 210 of FIG. 4. In reality the voids between canes 214' would not be present, instead the canes would be fused into a void-free body, as illustrated, for example, in FIGS. 1B or 3. However, FIG. 8 is shown to illustrate that the cores 216' maintain their relative positions with respect to one another after being drawn into a fiber. The outside of the fiber is thus illustrated as an elliptical cross section. Fiber 20 includes a drawn silica sleeve 212' enclosing the other constituents of the fiber 220 which although shown separately for ease of illustration will have fused together substantially without voids. The fiber 220 includes the plurality of core 216' and cladding 218' sections. The fiber also includes the spacers 222 and 224 which function as described in connection with FIG. 4. The non-circular shape, in conjunction with the orientation fiber 226' eases the task of orienting the fiber 220 within a connector 229. The connector 229 may suitably include a keying device 231 which ensures that fibers will be connected in only the proper orientation. It should be noted that although eight (two parallel rows of four) light conducting cores are illustrated in this exemplary embodiment, a wide range of core numbers may be employed in practice. In multi-source/multi-receiver applications each core 216' may be used to carry a different signal such as the data, address, and control signals employed in parallel communications systems. In such an application, the number of cores dedicated to address and data lines would preferably be a multiple of two. By way of example, a common ribbon connector may have eight data lines. It will be recognized that a number of additional control or other lines may be employed so that the total number of lines in a ribbon type may not be an even number. However, the present invention contemplates and makes it possible to readily utilize a large plurality of cores such as eight or sixteen in a single optical fiber.

Figure 9:
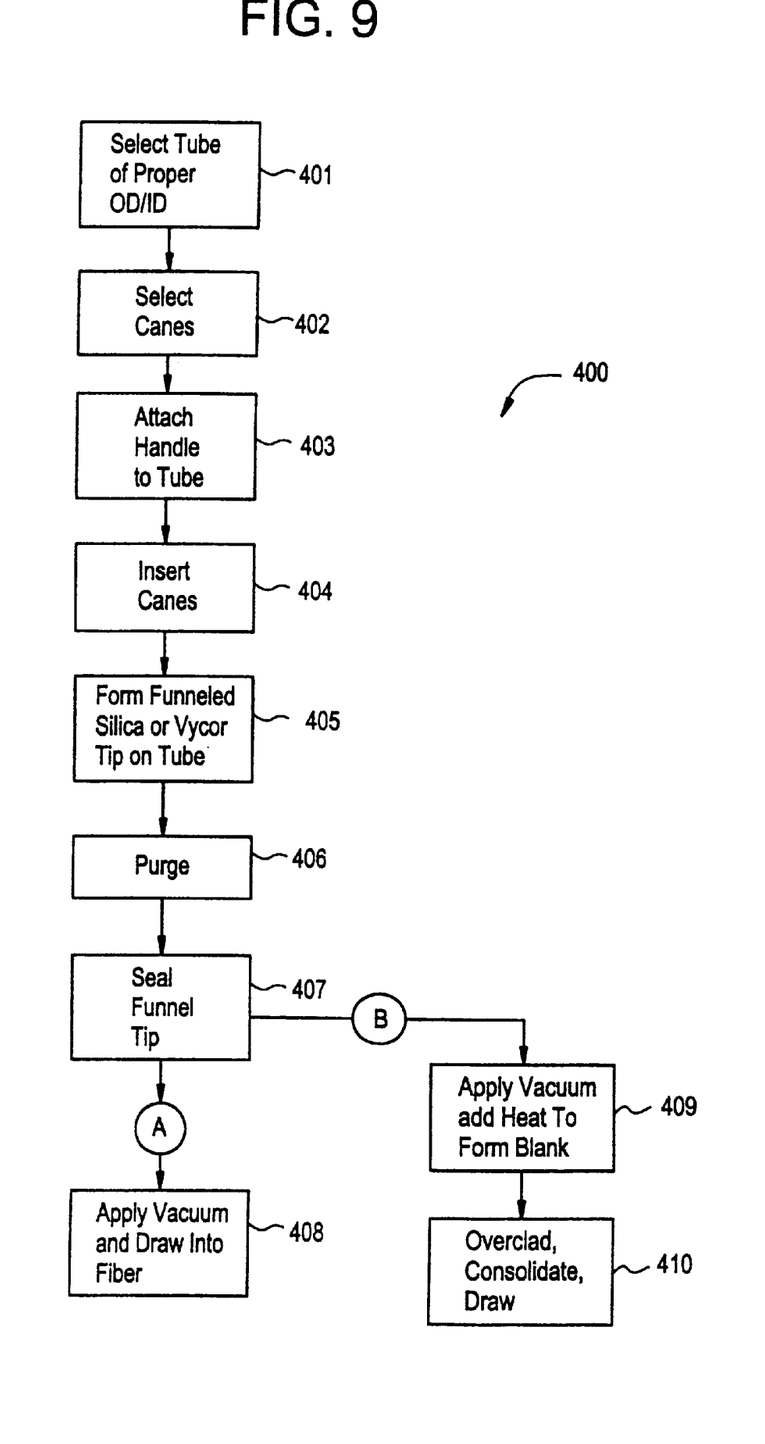
FIG. 9 is a flowchart illustrating aspects of two methods of cost effectively manufacturing multicore optical fibers in accordance with the present invention.

The flow chart of FIG. 9 illustrates in general terms two methods 400 which may be employed to manufacture multicore fibers according to the present invention. Both methods begin at step 401 in which a suitably dimensioned tube or sleeve, such as the silica tube 12 of FIG. 1 having the appropriate outer diameter and inner diameter, is selected or formed. For example, such a tube may be purchased or may be produced by an OVD laydown process. Next, in step 402, the number, material, core/clad ratio and size of the canes, such as the core canes 14 are selected to fit the inner diameter of the tube and application constraints. In step 404, the tube is filled with the multiple canes which are inserted into the open end of the tube. The packing arrangement may be computed using a CAD package or otherwise. Filler canes will preferably be employed to ensure that the final fiber is substantially free of voids and that round cross-section cores result upon drawing.

The number of cores, the diameter of each blank, the packing fraction, and the arrangement of cores within the sleeve have all been determined at this point in the process. The number of cores will typically be determined to suit the particular design specifications, particularly in a case where each core is designed to carry a separate signal. The symmetrical placement of cores and the arrangement of spacers within the silica sleeve, when such spacers are used, may be determined with the aid of computer aided design equipment. The symmetrical placement of cores and a tight, packed fit, one which prevents movement of the cores and voids within the sleeve during further processing, are the basic design objectives at this step in the process and the choices made will vary from application to application.

In step 405, a funneled silica or VycorJ tip is formed on one end of the tube opposite the handle. The funnel tip remains open at this point in the process, and the tube is submitted to a one hour chlorine purge through the tube cavity at elevated temperature so that the tube and canes are purged in step 406. It will be recognized that other purges or chemical treatments might be employed at this stage prior to drawing. In step 407, the funnel tip is sealed. For example, the funnel tip can be closed by flame working, in consolidation, or in the draw furnace depending upon the approach taken. At this point in the process, two alternatives A and B are possible. In the presently preferred approach, in step 408, a vacuum is applied by a pump to the tube and it is drawn to a substantially void free multiple core fiber. Alternatively, as shown in step 409, vacuum and heat are applied to form a substantially void free integral blank. Exemplary temperatures and times are set forth above. In step 410, the blank is overclad, consolidated and processed through fiber draw.

The foregoing description of specific embodiments of the invention has been presented for the purposes of illustration and description. It is not intended to be exhaustive or to limit the invention to the precise forms disclosed, and many modifications and variations are possible in light of the above teachings. For example, although graded index core implementations have been described in detail, the invention contemplates the use of step index or segmented index cores as well. Similarly, although single mode fibers have been discussed in detail, multimode fibers are also contemplated by the invention and may be employed where design constraints permit. Although the new fiber is particularly suited to communications applications and these application have been emphasized in the detailed description, the fibers of the invention are also suitable for imaging applications and may provide low cost, alternatives to imaging applications, especially those which require a relatively small diameter fiber having very good attenuation properties. The desired embodiments were chosen and described in order to best explain the principles of the invention and its practical application, and to thereby enable others skilled in the art to best utilize the invention. It is intended that the scope of the invention be limited only by the claims hereto.

We claim:

1. A multicore glass optical fiber, comprising:

a plurality of cores having index of refraction variations such that light is conducted internally along the length of said cores, and a glass clad region surrounding and substantially integrated with said cores which is elliptical or circular in cross-section, wherein said plurality of cores are selected such that they exhibit index of refraction variations sufficient to result in said multicore glass optical fiber exhibiting a bandwidth greater than 500 MHz-km at both 850 and 1300 nm.

2. The multicore fiber of claim 1, wherein said cores are distributed symmetrically within the inside of said glass sleeve.

3. The multicore fiber of claim 1, wherein said cores are arranged coherently with respect to each other throughout said fiber.

4. The multicore fiber of claim 1, further comprising:

an orienting cane positioned within said sleeve in a manner which indicates a preferred orientation of the fiber.

5. The multicore fiber of claim 1 wherein the glass sleeve prior to drawing has an outer diameter which is substantially double its inner diameter.

6. The multicore fiber of claim 1, wherein said cores are distributed within said sleeve in two parallel rows each row having at least 3 cores therein.

7. The multicore fiber of claim 6, further comprising an orienting cane positioned within said sleeve to indicate a preferred orientation of said fiber.

8. The multicore fiber of claim 1, wherein an even number of said cores are dedicated to the communication of data signals.

9. The multicore fiber of claim 8, wherein an even number of cores are dedicated to the communication of address signals.

10. The multicore fiber of claim 9, wherein at least one core is dedicated to the communication of control signals.

11. The multicore fiber of claim 10, wherein the number of cores corresponds to the number of signal lines in a standard signal interface.

12. The multicore fiber of claim 1, further comprising:

spacers distributed within the sleeve to insure that a desired cross sectional profile is maintained, said spacers also being integrated with said cores and said sleeve.

13. The multicore fiber of claim 1, wherein at least one of said cores is a single mode core for a light source having a central wavelength of interest.

14. The multicore fiber of claim 13, wherein said wavelength lies in the range 760 nm to 1660 nm.

15. The multicore fiber of claim 1, wherein each core includes $GeO_2$—$SiO_2$ composition glass.

16. The multicore glass optical fiber of claim 1 wherein the fiber has a diameter of approximately 62.5 $\mu$m to 200 $\mu$m.

17. The multicore glass optical fiber of claim 1 wherein the fiber is characterized by having substantially reduced bend sensitivity.

18. The multicore glass optical fiber of claim 1 wherein the fiber has a substantially reduced amount of germania when compared to a multimode fiber of equal diameter.

19. The multicore glass optical fiber of claim 18 wherein the fiber has at least an order of magnitude less bend sensitivity than a multimode optical fiber having the same outer diameter.

* * * * *